Dec. 27, 1966  F. SKRBINA  3,294,987

OVERLOAD PROTECTIVE DEVICE

Filed June 13, 1963

FRANK SKRBINA
INVENTOR

BY John L. Faulkner
Stuart Lurkitz
ATTORNEYS

United States Patent Office 3,294,987
Patented Dec. 27, 1966

3,294,987
OVERLOAD PROTECTIVE DEVICE
Frank Skrbina, Dearborn, Mich., assignor to Ford Motor Company, Dearborn, Mich., a corporation of Delaware
Filed June 13, 1963, Ser. No. 287,531
10 Claims. (Cl. 307—94)

This invention relates to an auxiliary or emergency power supply and safety device for an automotive vehicle.

In many instances a short circuit in the electrical system of an automotive vehicle will disable the operation of the entire vehicle. This may cause great inconvenience and expense to the operator or owner of the vehicle. In addition the short circuit may cause the current in the main circuit to rise to a level which causes an electrical fire destroying or injuring a substantial portion of the electrical system.

The instant invention lessens the possibility that the above-mentioned inconvenience, expense and damage will occur. This is accomplished by providing an auxiliary circuit which deenergizes the main power circuit when the current arises above a given value and provides power to the ignition system regardless of the short circuit in the main power supply circuit. In addition the auxiliary circuit may be connected to provide power to the lighting system when the main circuit is deenergized. The specific manner in which the above functions and advantages are achieved along with other advantages will be readily apparent when the detailed description which follows is read in conjunction with the drawings wherein:

Figure 1:
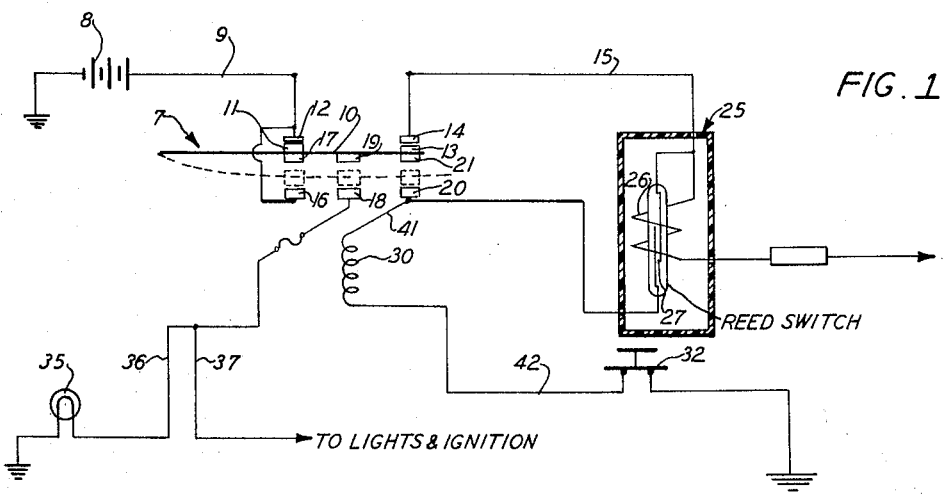
FIGURE 1 is an electrical schematic of the portion of the main power supply circuit modified by the addition of an auxiliary circuit.

Referring to FIGURE 1 a vehicle electrical system includes a power supply means such as battery 8 connected to the ignition system, lighting system and electrical accessories of the vehicle by a conductor 9, a first pair of normally closed contacts 11 and 12, a switch arm 10, a second pair of normally closed contacts 13 and 14, a conductor 15 and a magnetic reed switch 25. This circuit to the ignition system, lighting system and electrical accessories may be regarded as the main power supply circuit. The first pair of normally closed contacts 11 and 12 and the second pair of normally closed contacts 13 and 14 are part of a switch 7 which also contains a set of normally open contacts 16 and 17, a second set of normally open contacts 18 and 19 and a third set of normally open contacts 20 and 21. The conductive contacts 17, 19 and 21, like the conductive contacts 11 and 13, are rigidly and electrically attached to the switch arm 10 which is made from a conductive material.

The magnetic reed switch 25 is incapsulated in a plastic and comprises a coil 26 connected in the main power supply circuit and adjacent to a first set of normally open contacts 27. When the current in the main supply circuit exceeds a given value, a magnetic field will be developed by the coil 26 which causes the normally open contacts 27 to close. These normally open contacts 27 are connected to a coil or second relay coil 30 which in turn is connected to ground via a conductor 42 and a push-button switch 32. The closing of the contacts 27 thus connects the main power supply circuit to ground via the relay coil 30.

The relay coil 30 is arranged to actuate the switch arm 10 to open the normally closed contacts 11 and 12, and 13 and 14 and close the normally open contacts 16 and 17, 18 and 19, and 20 and 21. The opening of the contacts 11 and 12 opens the circuit from the battery 8 to the switch arm 10 while the closing of the contacts 16 and 17 again connects the battery 8 to the switch arm 10. The opening of the contacts 13 and 14 completely deenergizes the main power supply circuit and consequently the coil 26. The closing of the normally open contacts 18 and 19 completes a circuit from the battery 8 to the warning lamp 35 via the conductor 36 and also completes a circuit from the battery 8 to the lighting system and the ignition system via the conductor 37. The completion of the latter circuit permits the automotive vehicle to remain operative notwithstanding a short circuit or other failure in the main power supply circuit. The lighting system may or may not be energized depending on the particular design selected. The closing of normally open contacts 20 and 21 forms a holding circuit for the second relay coil 30 from the battery 8 to ground via the switch arm 10, contacts 16, 17, 20 and 21, conductors 41 and 42 and the push-button 32. This holding circuit maintains the relay coil 30 in an energized state. Such energization is necessary since the initial energization of the relay coil 30 via the contacts 27 of the magnetic reed switch has been terminated by the opening of the contacts 27 when the main power supply circuit is interrupted.

In operation the power supply means or battery 8 normally supplies power to the ignition system, lighting system and electrical accessories via the switch 7, conductor 15 and the coil 26 of the magnetic reed switch 25. When a short circuit occurs in the electrical accessory system or some other part of the main power supply circuit, the current through the coil 26 will rise and cause the contacts 27 to close energizing the relay coil 30 and connecting the main power supply circuit to ground via conductor 42. The energization of the relay coil 30 causes the switch arm 10 to move downwardly opening normally closed contacts 13 and 14 and closing normally open pairs of contacts 16 and 17, 18 and 19, 20 and 21. The opening of contacts 13 and 14 completely deenergizes the main power supply. The closing of the contacts 20 and 21 results in the continued energization of the relay coil 30. This energization of the relay coil 30 may be discontinued at any time by the actuation of the push-button switch 32. The closing of the contacts 18 and 19 completes an auxiliary power supply circuit to the warning lamp 35, the lighting system and the ignition system.

It should be apparent from the above detailed description that a new and simple circuit has been provided which functions to lessen the probability that a short circuit in the main supply circuit will cause an electrical fire destroying or injuring a substantial portion of the electrical system. Further the instant invention provides an auxiliary power supply circuit whereby the vehicle may be operated in spite of a short circuit in the main power supply circuit.

Figure 2:
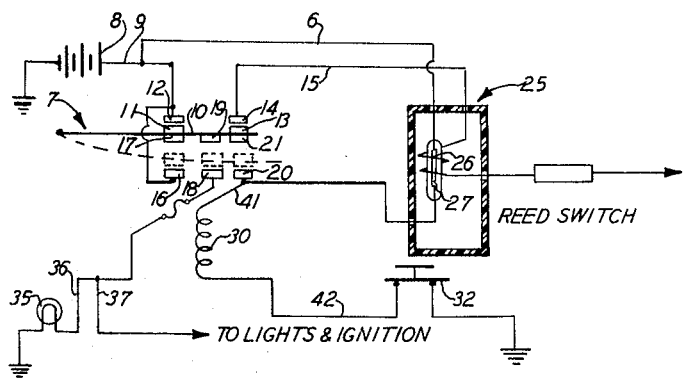
FIGURE 2 is an electrical schematic of an alternate embodiment of an auxiliary circuit.

FIGURE 2 shows an alternate embodiment of the invention. This embodiment is identical with the one described above and shown in FIGURE 1 with the exception that the battery 8 is connected to the contacts 27 by a conductor 6 rather than the conductor 15. This direct connection to the battery 8 enables power to be continually supplied to the contacts 27 and the coil 30 when these contacts are closed notwithstanding the opening and closing of the contacts 13 and 14.

Figure 3:
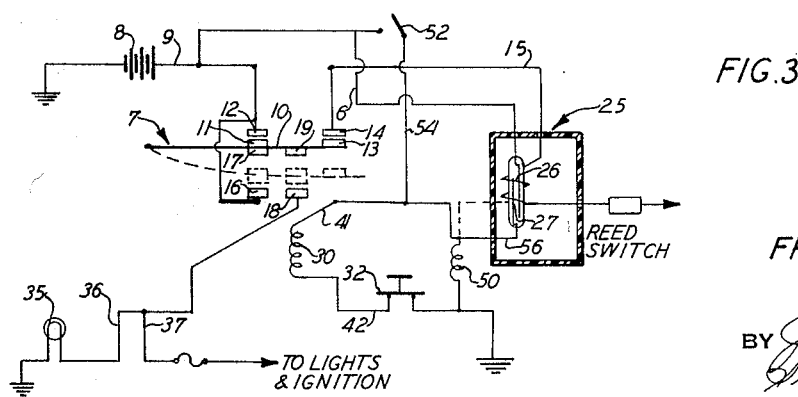
FIGURE 3 is an electrical schematic of another embodiment of the auxiliary circuit.

FIGURE 3 is another embodiment of the invention that is quite similar to the embodiment shown in FIGURE 2 and described above. This circuit includes an additional coil 50 that is connected to the battery 8 via the additional switch 52 and conductor 54 or via the conductor 56 and the magnetic reed switch 25. The coil 50, when energized, as adapted to maintain the reed switch contacts in a closed position as indicated by the broken lines. The holding of these contacts 27 closed enables the coil 30 to be continually energized via the reed switch contacts 27 thus eliminating the need for contacts 20 and 21 (FIGURE 1) and maintaining the stability of the switch 7. The switch 52 may be manually actuated. This enables a person doing repairs on the vehicle electrical system to disconnect the power supply from certain parts of the circuit and still maintain the power for lights or other selected components.

It should be understood that it is within the scope of the invention to alter the switching time of the magnetic reed switch by placing a magnetic material adjacent to the switch. The placement of such material around the magnetic reed switch may be such as to tend to retard the opening of the contacts 27 when the contacts 20 and 21 (FIGURE 1) are opened. This would tend to stabilize the energization of the coil 30 via the contacts 27.

It will be understood that the invention is not to be limited to the exact construction shown and described, but that various changes and modifications may be made without departing from the spirit and scope of the invention, as defined in the appended claims.

I claim:

1. In a vehicle having an electrical system including electrical accessories and an ignition system, the combination comprising a source of electrical energy, a main power supply circuit means for normally connecting said source of electrical energy to the electrical accessories and the ignition system; and an auxiliary electrical circuit means coupled to said main power supply circuit for opening said main power supply circuit means and for completing another power supply circuit from said source of electrical energy to the ignition system, said auxiliary electrical circuit means being activated when the current in the main power supply circuit means reaches a predetermined level.

2. The structure recited in claim 1 wherein the auxiliary circuit means includes a magnetic switch, comprising a first coil in circuit with the main power supply circuit means, a first pair of normally open contacts in circuit with the main power supply circuit means, a second coil in circuit with said first pair of normally open contacts and ground, said first coil adapted to close said first pair of normally closed contacts to connect the main supply circuit through said second coil when the current in the main power supply circuit means reaches said predetermined level.

3. The structure recited in claim 2 wherein said auxiliary electrical circuit means includes an ignition system circuit branch, said circuit branch connected in circuit with a second pair of normally open contacts, said second relay coil arranged to close said second pair of normally open contacts when energized, whereby the closing of the first pair of normally open contacts energizes the second relay coil to close the second pair of normally open contacts and thereby complete a circuit to said ignition system circuit branch.

4. The structure recited in claim 2 wherein a first pair of normally closed contacts are in circuit with the main power supply circuit and operated by the energization of said second relay coil to open circuit said main power supply circuit.

5. In a vehicle having an electrical system including electrical accessories, an ignition system and a lighting system, the combination comprising a source of electrical energy, a main power supply circuit means for normally connecting said source of electrical energy to the electrical accessories, the ignition system and the lighting system and an auxiliary electrical circuit means coupled to said main power supply circuit for open circuiting the main power supply circuit means and for completing another power supply circuit from said source of electrical energy to the ignition system and the lighting system when the current in the main power supply circuit exceeds a predetermined value.

6. In a vehicle having an electrical system which includes a power supply means, electrical accessories and an ignition system, the combination comprising a first circuit connected to said power supply means, said electrical accessories and said ignition system, a first pair of normally open contacts, a second circuit connectable to said power supply means and said ignition system by said first pair of normally open contacts, a first pair of normally closed contacts connected in said first circuit, and means coupled to said first circuit for sensing when the current in said first circuit exceeds a given value and means coupled to said last mentioned means for closing said first pair of normally open contacts and for opening said first pair of normally closed contacts, whereby said first circuit is open circuited and said second circuit is connected to supply power to said ignition system.

7. In a vehicle having an electrical system including electrical accessories, an ignition system and power supply means, the combination comprising a first circuit connected from said power supply means to said electrical accessories and to said ignition system, and an auxiliary circuit means connected from said power supply means to said ignition system, said auxiliary circuit means comprising a magnetic switch having a first pair of normally open contacts in circuit with said power supply means, a first coil connected in circuit with said first circuit so that when the current in said first circuit exceeds a given value said first coil will close said first pair of contacts to complete a circuit, a second pair of normally open contacts in circuit with said power supply means and said ignition system and a second coil connected in circuit with said first pair of normally open contacts and adapted to close said second pair of normally open contacts to complete a circuit from said power means to said ignition system when energized by the closing of said first pair of normally open contacts.

8. In a vehicle having an electrical system including electrical accessories, an ignition system and power supply means, the combination comprising a first circuit connected from said power supply means to said electrical accessories and to said ignition system, and an auxiliary circuit means connected from said power supply means to said ignition system, said auxiliary circuit means comprising a magnetic switch having a first pair of normally open contacts in a parallel circuit relationship with said electrical accessories and said ignition system, and a first coil connected in series circuit relationship with said first circuit so that when the current in said first circuit exceeds a given value said first coil will close said first pair of contacts to complete a circuit, a second pair of normally open contacts in circuit with said power supply means and said ignition system, a first pair of normally closed contacts connected in said first circuit, and a second coil connected in circuit with said first pair of normally open contacts, said second coil adapted to close said second pair of normally open contacts to complete a circuit from said power means to said ignition system and adapted to open said first pair of normally closed contacts when energized by the closing of said first pair of normally open contacts.

9. In a vehicle having an electrical system including electrical accessories, an ignition system and power supply means, the combination comprising a first circuit connected from said power supply means to said electrical accessories and to said ignition system, and an auxiliary circuit means connected from said power supply means to said ignition system, said auxiliary circuit means comprising a magnetic switch having a first pair of normally open contacts and in a parallel circuit relationship with said electrical accessories and said ignition system, and a first coil connected in series circuit relationship with said first circuit so that when the current in said first circuit exceeds a given value said first coil will close said first pair of normally open contacts completing a circuit, a second pair of normally open contacts in circuit with said power supply means and said ignition system, a first pair of normally closed contacts connected in said first circuit and a second coil connected in circuit with said first pair of normally open contacts, said second coil adapted to close said second pair of normally open contacts to complete a circuit from said power supply means to said ignition system and adapted to open said first pair of normally closed contacts when energized by the closing of said first pair of normally open contacts, and a third set of normally open contacts in circuit with said power supply means and said second coil and adapted to be closed by said second coil and complete a circuit from the power supply means through said second coil to ground.

10. In a vehicle having an electrical system including electrical accessories, an ignition system and power supply means, the combination comprising a first circuit connected from said power supply means to said electrical accessories and to said ignition system, and an auxiliary circuit means connected from said power supply means to said ignition system, said auxiliary circuit means comprising a magnetic switch having a first pair of normally open contacts in parallel circuit relationship with said electrical accessories and said ignition system, and a first coil connected in series circuit relationship with said first circuit so that when the current in said first circuit exceeds a given value said first coil will close said first pair of normally open contacts completing a circuit, a second pair of normally open contacts in circuit with said power supply means and said ignition system, a first pair of normally closed contacts connected in said first circuit and a second coil connected in circuit with said first pair of normally open contacts and adapted to close said second pair of normally open contacts to complete a circuit from said power supply means to said ignition system and adapted to open said first pair of normally closed contacts when energized by the closing of said first pair of normally open contacts, a third set of normally open contacts in circuit with said power supply and said second coil and adapted to be closed by said second coil and complete a circuit from said power supply means through said second coil to ground, and a push-button switch in circuit with said second relay coil and adapted to be opened, thereby deenergizing said second relay coil, whereby the auxiliary circuit means is deenergized and the first circuit may again be energized.

References Cited by the Examiner
UNITED STATES PATENTS

| | | | |
|---|---|---|---|
| 1,207,016 | 12/1916 | Fryer | 317—9 X |
| 1,726,994 | 9/1929 | Murray | 340—255 |
| 2,581,338 | 1/1952 | La Roza | 307—10 X |
| 2,759,176 | 7/1956 | Kennedy | 340—255 X |
| 2,774,842 | 12/1956 | Shrader | 307—10 X |
| 2,913,590 | 11/1959 | Todd | 317—9 X |
| 3,074,013 | 1/1963 | Bowden | 340—255 X |

ORIS L. RADER, *Primary Examiner.*

T. J. MADDEN, *Assistant Examiner.*